United States Patent [19]  [11] 3,915,794
Zygraich et al. [45] Oct. 28, 1975

[54] STABILIZING COMPOSITIONS FOR CELL-FREE VIRUSES AND CELL-FREE VIRUS PREPARATIONS CONTAINING THEM

[75] Inventors: Nathan Zygraich, Brussels; Julien Peetermans, Rixensart, both of Belgium

[73] Assignee: Recherche et Industrie Therapeutiques (R.I.T.), Belgium

[22] Filed: Feb. 9, 1973

[21] Appl. No.: 330,912

[52] U.S. Cl. .......... 195/1.8; 34/5; 195/1.1; 195/1.7; 424/80; 424/89
[51] Int. Cl.² .......... C12K 7/00
[58] Field of Search .......... 34/5; 195/1.1–1.8; 424/89, 80

[56] References Cited
UNITED STATES PATENTS
| | | | |
|---|---|---|---|
| 3,642,574 | 2/1972 | Okazaki et al. | 195/1.5 |
| 3,674,861 | 7/1972 | Churchill | 424/89 |
| 3,783,098 | 1/1974 | Calnek et al. | 195/1.1 |

FOREIGN PATENTS OR APPLICATIONS
| | | |
|---|---|---|
| 1,028,741 | 10/1958 | Germany |
| 644,349 | 6/1964 | Belgium |
| 2,017,373 | 4/1971 | Germany |
| 1,403,608 | 5/1965 | France |

OTHER PUBLICATIONS

Calnek et al. Appl. Microbiol. 20(5): 723–726 (1970), "Lyophilization of Cell–Free Marek's Disease Herpes Virus and Herpes Virus from Turkeys," as Abst. in Chem. Abstracts, 74, No. 11465J, (1971).
Bouroncle et al. Chem. Abst. 73, No. 85686h, (1970).
Mizrahi et al. Chem. Abst. 73, No. 53686s, (1970).
Farrant Chem. Abst. 71, No. 46004y, (1969).
Mazur Chem. Abst. 71, No. 109716e, (1969).
Woolfrey Chem. Abst. 62, No. 4305g, (1962).

*Primary Examiner*—Shep K. Rose
*Attorney, Agent, or Firm*—Alan D. Lourie; William H. Edgerton

[57] ABSTRACT

New stabilizing compositions for cell-free viruses comprising a buffered solution of polyvinylpyrrolidone, sucrose, glutamate and a chelating agent. The compositions stabilize the viruses during their extraction from the cells to which they are associated and during the lyophilization and/or storage of the cell-free viruses. The compositions are useful for the preparation of cell-free virus vaccines.

12 Claims, No Drawings

3,915,794

STABILIZING COMPOSITIONS FOR CELL-FREE VIRUSES AND CELL-FREE VIRUS PREPARATIONS CONTAINING THEM

The present invention relates to novel compositions which stabilize cell-free viruses from cells infected with cell-associated viruses, to the cell-free virus preparations containing said stabilizing compositions and to the method for obtaining said stabilized cell-free virus preparations.

It is known that the extraction of cell-associated viruses from the cells to which said viruses are associated result in loss of most of the viral material unless the reaction medium be supplemented with some substances or composition of substances which have been found to stabilize the virus during the disruption of the cells.

It is also well known (e.g. U.S. Pat. No. 3,519,710) that the yields in virus storage and virus manipulation such as lyophilization are markedly improved by addition of substances or composition of substances which are known as lyophilization stabilizers.

Most of the substances or composition of substances which are described as stabilizing viruses during the disruption of the cells do not substantially stabilize the viruses during their further lyophilization and storage and, in general, the lyophilization stabilizers do not substantially stabilize the cell-free viruses during their extraction from the cells to which they are initially associated.

In a work on Marek's disease virus and on the FC-126 strain of turkey herpes virus which is known to provide protection against Marek's disease, Calnek et al. (see for instance Calnek et al. Appl. Microbiol. 70, 723–726, 1970) have described compositions which simultaneously do stabilize cell-free viruses during their extraction from the cells and during their subsequent lyophilization and storage.

The combinations of substances which up to now have been described as affording stabilization during both extraction and lyophilization steps and storage essentially comprise an animal protein material which is albumin and/or casein.

We have now surprisingly found that in such stabilizing compositions, the protein material can advantageously be replaced by a non protein material which is polyvinylpyrrolidone having an average molecular weight of less than 40,000 and preferably ranging about 10,000. The use of polyvinylpyrrolidone avoids the disadvantages which can result from the use of animal proteins; polyvinylpyrrolidone indeed is essentially non-reactogenic and, as the commercial grade of this synthetic product meets high quality standards, it is devoid of any possible contaminant.

The present invention thus relates to compositions which stabilize cell-free viruses not only during their extraction from the cells to which they are initially associated but also during their further lyophilization and/or storage.

More particularly, said stabilizing composition for cell-free preparation of cell-associated virus comprises a buffered aqueous solution (at a pH comprised between 6.5 and 7.5) of from 0.1 to 10 % of polyvinylpyrrolidone having an average molecular weight inferior to 40,000, and preferably ranging about 10,000; from 2 to 10 % of a sugar, preferably sucrose; from 0.05 to 0.2 % of a glutamic acid alkaline salt, e.g. sodium salt and from 0.1 to 0.5 % of a chelating agent, e.g. an edetate alkaline salt such as sodium edetate, the solution being preferably phosphate buffered.

The invention is illustrated by the following examples referring to a group B herpes virus isolated from turkeys (HTV) and previously identified as FC-126 or ATCC VR No. 584 and to varicella zoster virus but the invention is also applicable to other cell-associated viruses and more particularly to other group B herpes virus such as cytomegalo viruses.

EXAMPLE 1

Ten days old chick embryos deriving from a specific pathogen free flock are minced and trypsinized. The trypsinized cells are collected and centrifuged in a growth medium consisting of Earle's basal medium supplemented with glucose (0.84 g/l); lactalbumin hydrolysate (2.5 g/l); tryptose phosphate broth (1.5 g/l) and 50 ml/l of inactivated calf serum.

After centrifugation, the cells are pooled, resuspended in said growth medium and four chick embryo fibroblast cultures are prepared in 5 liter production flasks.

When the monolayers are confluent, i.e. after a 2 days incubation at 37° C, the cultures are examined under the microscope, the growth medium is withdrawn and replaced by an equal volume of maintenance medium consisting of Earle's basal medium supplemented with glucose (0.84 g/l); lactalbumin hydrolysate (2.5 g/l); tryptose phosphate broth (0.6 g/l); 20 ml/l of inactivated calf serum and hydrocortisone (5 g/l), said medium being supplemented with neomycin sulfate (equivalent to 50 mg of neomycin base per liter).

The flasks are inoculated with turkey herpes virus (HTV) strain FC-126 and incubated at 37° C to constitute the source of virus. At the harvest, the supernatant fluids of the cultures are discarded and the infected monolayers are removed with a trypsine/sodium edetate solution. The infected cells are pooled, centrifuged and split up into 4 equal parts. Each of these parts, which represents the material derived from one culture flask, is suspended in 10 ml. of various stabilizing compositions as reported in the following Table I and each cell suspension is sonicated during two minutes at the highest power of the sonicator (Branson Europa sonicator model J 22, an apparatus sold by Branson Europa N.V., Soest, The Netherlands). A fraction of each sample is used for titration, the remaining is stored at −70° C before freeze-drying.

For virus titrations, each sample is inoculated into two 24-hour-chick fibroblast cultures, the inoculum—the volume of which is 0.1 ml.—is put on a surface of 45 cm$^2$ and the dilutions are made in SPG medium. The inoculum is adsorbed for 30 minutes at 38.5° C before addition of the maintenance medium. The cultures are then incubated at 38.5° C and focal lesions are enumerated after 4 to 5 days incubation. Each figure in Table I gives the result of two individual titrations; the average of the focus counts from two replicate cultures and the dilution factor are used to estimate the number of PFU (plaque forming unit) per ml.

Table I

| Stabilizer | Titer after sonication (×10²) expressed in PFU | Titer after freeze-drying (×10²) expressed in PFU | % recovery after freeze-drying |
| --- | --- | --- | --- |
| SPGE + A(1%) | 49 | 22 | 45 |
| SPGE + K15(1%) | 65 | 24 | 37 |
| SPGE + K30(1%) | 64 | 12 | 18.5 |
| SPGE + K90(1%) | 44 | 6 | 1.4 |

In the above Table I, SPGE represents an aqueous solution (pH 7.2) of sucrose (0.218 M); potassium phosphate, monobasic (0.0038 M); sodium phosphate, dibasic (0.0072 M); monopotassium glutamate (0.0049 M) and sodium edetate (0.2 %).

A represents bovine albumin (powder)
K 15 represents polyvinylpyrrolidone (MW 10,000)
K 30 represents polyvinylpyrrolidone (MW 40,000)
K 90 represents polyvinylpyrrolidone (MW 360,000)

The results of Table I show the relationship between molecular weight and stabilizing effect of polyvinylpyrrolidone. The influence of the molecular weight is not particularly sensible for the stabilization of the virus during the sonication step but it is very striking for the freeze-drying step. Polyvinylpyrrolidone stabilizes the virus during both the sonication and freeze-drying steps provided its molecular weight is sufficiently low. There is no significant difference between the stabilizing effect of bovine albumin and the stabilizing effect of K 15.

EXAMPLE 2

Higher titer chick embryo fibroblast material is prepared, using the technique described in Example 1. The results are reported in Table II and confirm the stabilizing effect of polyvinylpyrrolidone K 15 for virus preparations having titers 10 to 20 times higher than those reported in Example 1.

Similarly, no significant difference appears between the respective stabilizing effects of bovine albumin and K 15. However, for the freeze-drying step, K 30 is again found to be less efficient than K 15 or bovine albumin. Moreover, Table II indicates that freeze-dried material is equally preserved under severe storage conditions (7 days at 37° C) whichever stabilizer is used.

The figures of Table II are obtained from the same testing scheme and method as that indicated in Example 1.

Table II

| Batch No. | Stabilizer | Titer after freeze-drying (× 10³) expressed in PFU | Titer after 7 days storage 37°C (×10³) expressed in PFU | % of infectivity recovered after 7-days at 37°C |
| --- | --- | --- | --- | --- |
| 392 | SPGE + A | 117 | 59 | 50 |
|  | SPGE + K30 | 57 | 29 | 50 |
| 393 | SPGE + A | 132 | 60 | 45.5 |
|  | SPGE + K15 | 122 | 59 | 48 |
| 394 | SPGE + A | 199 | 88 | 44 |
|  | SPGE + K15 | 218 | 93 | 43 |

EXAMPLE 3

Cultures of human embryonic lung fibroblasts (WI 38) at the 30th passage in one liter flask are inoculated with embryonic lung fibroblasts whole cells infected with the Temple strain of varicella zoster virus (at the 43th passage on WI 38).

The growth media are that described in example 1. An inoculum sufficient to produce a near confluent cytopathic effect after three days at 35° C is used.

At this time, the monolayers are removed with a sodium edetate solution. The infected cells are pooled, centrifuged and split up into three equal parts.

Each of these parts, which represents the material derived from three culture flasks, is suspended in 30 ml. of various stabilizer compositions as reported in Table III and each cell suspension is sonicated for two minutes at the highest power of the sonicator (reference indicated in example 1). After sonication, the suspension is filtered on a 3 $\mu$ membrane. A fraction of each sample is used for titration before and after sonication and also after filtration. For virus titration, each sample is inoculated into two human embryonic lung fibroblast cultures, the inoculum (0.1 ml.) being put on a 45 cm² surface and the dilution being made in SPG medium. The inoculum is adsorbed for 30 minutes at 35° C before addition of maintenance medium consisting of Earle's basal medium supplemented with 2 % inactivated calf serum. After 4 to 7 days incubation at 35° C the focal lesions are counted.

Table III

| Stabilizer | Titer before sonication expressed in PFU/ml. | Titer after sonication expressed in PFU/ml. | Titer after filtration expressed in PFU/ml. |
| --- | --- | --- | --- |
| SPGE + K15 | 28,000 | 600 | ND |
| SPGE + K30 | 30,000 | 1,000 | ND |
| SPGE + A* | 30,000 | 1,000 | 1,000 |

*Human Albumin.

It appears that the stabilizing properties of PVP is comparable to that of human albumin from Table III.

EXAMPLE 4

The sonicated cell-free material obtained in example 2 is distributed into 3 ml. glass vials, each vial containing 0.5 ml. of cell-free material (corresponding to from 250 to 1,000 doses of Marek's disease vaccine). After freeze-drying, the vials are sealed and stored at 20° C.

After reconstitution by adding a stabilizing composition consisting of sucrose (74.6 g); potassium phosphate, monobasic (0.52 g); sodium phosphate, dibasic (1 g); monopotassium glutamate (0.8 g) in distilled water (up to 1 liter) to obtain 0.2 ml. of vaccine preparation per dose, the Marek's disease vaccine is administered by intramuscular or subcutaneous route.

EXAMPLE 5

The sonicated cell-free material obtained in example 3 is distributed into 3 ml. glass vials, each vial containing 0.5 ml. of cell-free material (corresponding to 1 vaccine dosage unit). After freeze-drying, the vials are sealed and stored at −20° C.

After reconstitution by adding 0.5 ml. of pyrogen free distilled water per dosis, the varicella zoster virus vaccine is administered by parenteral route.

We claim:

1. A viable stable virus preparation comprising a cell-free preparation of a cell-associated Group B herpes virus and a stabilizing composition wherein the stabilizing composition comprises a buffered aqueous solution of from 0.1 to 10 % of polyvinylpyrrolidone having an average molecular weight of up to 40,000, from 2 to 10 % of a sugar, from 0.05 to 0.2 % of a glutamic acid alkali metal salt and from 0.1 to 0.5 % of a chelating agent, the pH of the buffered solution being comprised between 6.5 and 7.5.

2. A virus preparation according to claim 1, wherein the average molecular weight of polyvinylpyrrolidone is about 10,000 to 40,000.

3. A virus preparation according to claim 1, wherein the sugar is sucrose.

4. A virus preparation according to claim 1, wherein the glutamic acid salt is the sodium salt.

5. A virus preparation according to claim 1, wherein the chelating agent is an edetate alkali metal salt.

6. A virus preparation according to claim 1, wherein the solution is buffered by a phosphate buffer.

7. A virus preparation according to claim 1, wherein the cell-associated virus is a turkey herpes virus.

8. A virus preparation according to claim 7, wherein the turkey-herpes virus is turkey herpes virus ATCC VR-584.

9. A virus preparation according to claim 1, wherein the cell-associated virus is varicella zoster virus.

10. A virus preparation according to claim 1, wherein the average molecular weight of polyvinylpyrrolidone is about 10,000 to 40,000, the sugar is sucrose, the glutamic acid salt is the sodium salt, the chelating agent is an edetate alkali metal salt, the solution is buffered by a phosphate buffer, and the cell-associated virus is a turkey herpes virus.

11. A process for preparing a stable cell-free virus preparation of a cell-associated Group B herpes virus according to claim 1 comprising admixing a suspension of cells infected with cell-associated Group B herpes virus with a buffered aqueous solution of from 0.1 to 10 % of polyvinylpyrrolidone having an average molecular weight of up to 40,000, from 2 to 10% of a sugar, from 0.05 to 0.2 % of a glutamic acid alkaline salt and from 0.1 to 0.5 % of a chelating agent, the pH of the buffered solution being between 6.5 and 7.5, and then disrupting the infected cells.

12. A process according to claim 11, wherein the obtained stable cell-free virus preparation is further lyophilized.

* * * * *

UNITED STATES PATENT AND TRADEMARK OFFICE
CERTIFICATE OF CORRECTION

PATENT NO. : 3,915,794
DATED : October 28, 1975
INVENTOR(S) : Nathan Zygraich and Julien Peetermans It is certified that error appears in the above-identified patent and that said Letters Patent are hereby corrected as shown below:

Column 4, line 47, change "20°C" to --- -20°C ---.

Signed and Sealed this third Day of February 1976

[SEAL]

Attest:

RUTH C. MASON
*Attesting Officer*

C. MARSHALL DANN
*Commissioner of Patents and Trademarks*